Patented Dec. 1, 1925.

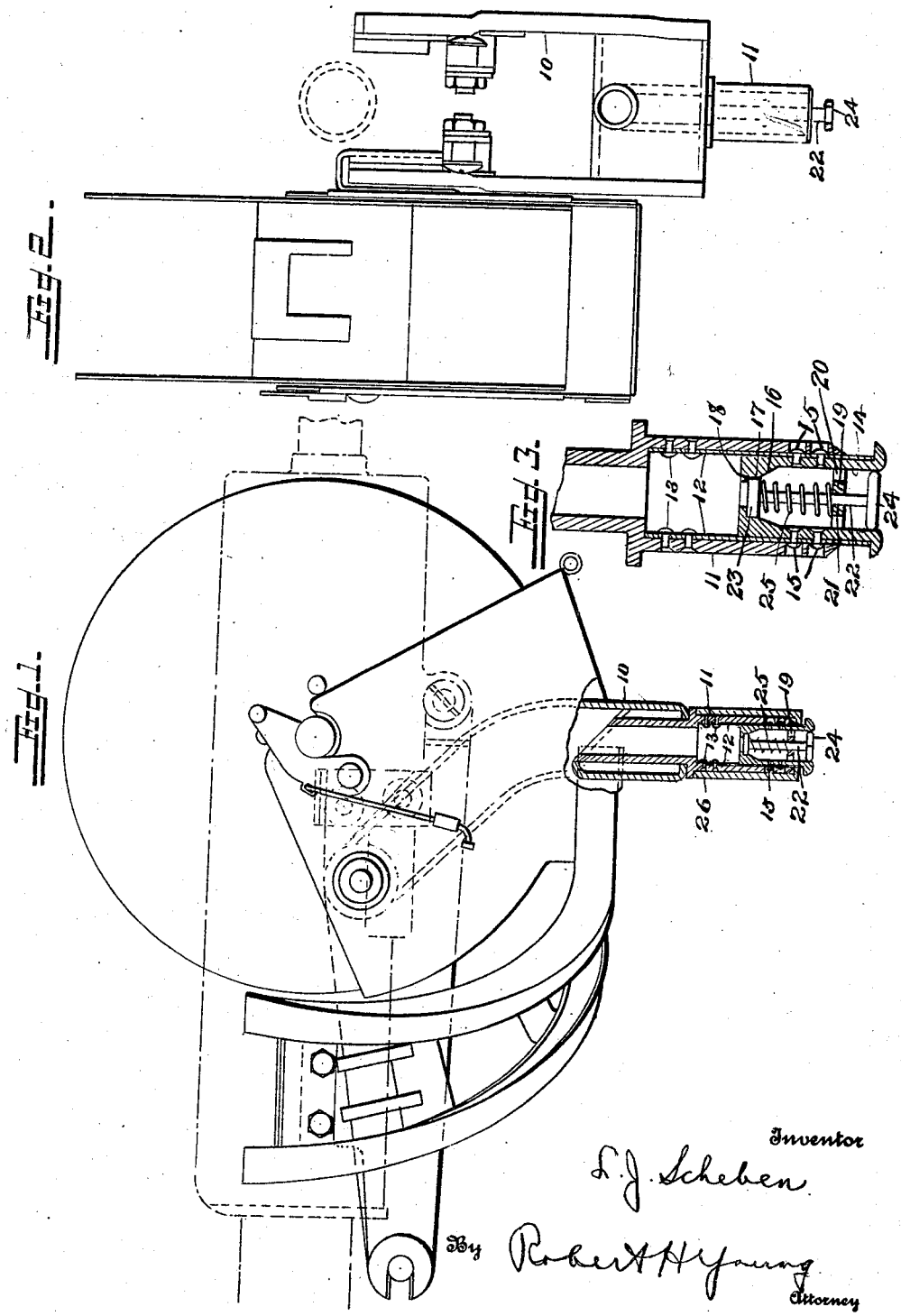

1,563,442

UNITED STATES PATENT OFFICE.

LAURENCE J. SCHEBEN, OF DAYTON, OHIO.

SHAFT THRUST LOCK.

Application filed November 2, 1921. Serial No. 512,335.

*To all whom it may concern:*

Be it known that I, LAURENCE J. SCHEBEN, a citizen of the United States, residing at Dayton, in the county of Montgomery and State of Ohio, have invented certain new and useful Improvements in Shaft Thrust Locks, of which the following is a specification.

This invention relates to gun mounts and more particularly to that type of gun mount used on airplanes.

The object of this invention is to provide a gun mount of the kind above set forth with a locking means that will prevent end thrust removal of the stem of a gun mount fork from the support socket of a gun turret. Another object of this invention resides in the provision of a locking means for the stem of a gun mount fork which includes an indicating means as to whether or not the stem is or is not locked in the socket of a gun turret.

With the above and other objects in view, the invention consists in the novel construction, combination and arrangement herein fully described, illustrated and claimed.

In the drawings:

Figure 1 is a side elevation of a gun mount assembly, the stem of which is shown in vertical section;

Figure 2 is a rear elevation of a gun mount assembly showing the invention applied;

Figure 3 is an enlarged vertical section of the stem of the gun mount assembly.

Referring to the parts by reference numerals, 10 designates the gun mount fork, having integrally therewith the stem 11, which is hollowed out and has secured therein at diametrically opposite points springs 12 by the means 13. Adjacent their lower ends each of the springs 12 is provided with a latch 14, the locking portion of which extends an appreciable distance below the lower end of the stem 11. These latches are secured to the springs 12 by means of the rivets 15 and allow for the movement of the springs and latches to a position as shown in Figure 1. The stem 11 is provided with apertures into which the heads of the several rivets may be received when the latches are in a locking position. The upper ends of the latches 14 are enlarged to provide inner inclined edges 16, each terminating in a straight edge portion 17 providing abutment shoulders 18 for a purpose to be hereinafter set forth.

A disc 19 is fixedly secured to the lower end of the stem 11 and has portions cut away therefrom as at 20 to allow for the movement of the depending portions of the latches 14. Slidable in an aperture 21 formed in the disc 19 is a plunger rod 22 having at its upper end a plunger 23 and at its lower end a collar 24. An expansible coil spring 25 is wound about the plunger rod 22 and one end thereof is engaged with the under face of the plunger 23 and as its opposite end in engaged against the disc 19 it normally urges the plunger 22 upwardly in the stem 11. The plunger 23 is preferably made integrally with the plunger rod 22. However, the collar 24 on the lower end of the said rod is detachable to allow for the assembly of the device.

In operation, assuming the device in its unlocked position, as shown in Figure 2, the springs 12 normally urge the latches 14 inwardly and therefore the device would be in this position when inserted in the support socket. After the insertion of the stem 11 in the socket 26 the collar 24 is manually moved upwardly, and because of the wedging action of the plunger 23 and the inclined edges 16, the latches are spread to assume a locked position, as shown in Figure 1, thus securely engaging the socket and retaining the stem in the same. The collar 24 is positioned between the depending portions of the latches when the same are spread, therefore providing a secondary means of preventing the inward movement of the latches. After inserting the stem, if, for any reason, the plunger would move downwardly and thus allow the latches to move inwardly and thereby become disengaged from the socket, this could easily be perceived because the collar 24 would obviously be positioned below the ring and come into view of the operator.

It will be seen from the foregoing that a locking device for the stem of a gun mount fork in the support socket of a gun turret has been provided which insures positive latching of the stem in the socket while also allowing for the easy removal of the same when desired. The device also provides a dual means to prevent the accidental inward movement of the latches due to vibration or other causes, the said means being first the plunger 23 which, when placed against the abutment shoulders as shown in Figure 1 prevents the inward movement of the latches, and, second, the collar 24 which engages the inner sides of the depending portions of the latches as shown in the same figure.

Having thus described my invention, I claim:

1. A latching device for a gun mount, comprising in combination, a socket member carried by the gun turret, and a latch member insertable into the socket member, the latch member comprising a pair of latches, and a longitudinally movable spring-pressed device engageable with the latches for urging the latches to latching position.

2. A latching device for a gun mount, comprising in combination, a socket member carried by the gun turret, and a latch member insertable into the socket member, the latch member comprising a pair of latches, and a longitudinally movable spring-pressed device engageable with each latch at two longitudinally separated points, for urging the latches to latching position.

3. In a device of the kind described, a receiving member, a member adapted for detachable placement in said receiving member, a locking means, including spring latches, provided with inclined inner edges, a movable plunger adapted for engagement with said inclined edges to urge said latches outwardly and means for manually moving said plunger against said edges for the purpose set forth.

4. In a device of the kind described, a receiving member, a member adapted for detachable placement in said receiving member, having spring latches adapted to engage said receiving member, inclined edges on the upper ends of said latches, a plunger adapted for engagement with said inclined edges to urge said latches outwardly and a collar in rigid connection with said plunger for engagement with said latches to retain the same in a spread position.

In testimony whereof I have affixed my signature.

LAURENCE J. SCHEBEN.